(12) United States Patent
Nakamura

(10) Patent No.: US 10,797,932 B2
(45) Date of Patent: Oct. 6, 2020

(54) COMMUNICATION DEVICE, LINK-UP METHOD, AND COMMUNICATION SYSTEM

(71) Applicant: Renesas Electronics Corporation, Tokyo (JP)

(72) Inventor: Masaru Nakamura, Tokyo (JP)

(73) Assignee: RENESAS ELECTRONICS CORPORATION, Tokyo (JP)

(*) Notice: Subject to any disclaimer, the term of this patent is extended or adjusted under 35 U.S.C. 154(b) by 84 days.

(21) Appl. No.: 15/966,818

(22) Filed: Apr. 30, 2018

(65) Prior Publication Data

US 2018/0351778 A1   Dec. 6, 2018

(30) Foreign Application Priority Data

May 31, 2017   (JP) ................. 2017-108776

(51) Int. Cl.
| | |
|---|---|
| *G06F 15/16* | (2006.01) |
| *H04L 29/06* | (2006.01) |
| *H04L 29/08* | (2006.01) |
| *H04L 12/403* | (2006.01) |
| *H04L 12/40* | (2006.01) |
| *G06F 9/46* | (2006.01) |
| *G06N 20/00* | (2019.01) |

(52) U.S. Cl.
CPC .......... *H04L 29/06115* (2013.01); *G06F 9/46* (2013.01); *H04L 12/403* (2013.01); *H04L 12/40169* (2013.01); *H04L 29/06537* (2013.01); *H04L 29/08585* (2013.01); *G06N 20/00* (2019.01)

(58) Field of Classification Search
CPC ... G06N 20/00; H04L 12/28; H04L 29/06115; H04L 29/06537; H04L 29/08585

USPC ......................................... 709/227, 228, 229
See application file for complete search history.

(56) References Cited

U.S. PATENT DOCUMENTS

| | | | |
|---|---|---|---|
| 6,879,570 B1* | 4/2005 | Choi ................... | H04W 84/20 370/329 |
| 9,019,959 B2 | 4/2015 | Tanizawa | |
| 2003/0088635 A1* | 5/2003 | Chen ................ | G06F 15/17375 709/208 |
| 2012/0170637 A1* | 7/2012 | Huang .............. | H04L 25/03057 375/231 |

(Continued)

FOREIGN PATENT DOCUMENTS

JP         2012-74848 A        4/2012

*Primary Examiner* — Liang Che A Wang
(74) *Attorney, Agent, or Firm* — McDermott Will & Emery LLP

(57) ABSTRACT

In order to quickly and reliably establish link up, when a communication device detects power on or link down, an idle signal generation circuit generates an idle signal. Then, an I/F circuit transmits the idle signal to a communication device which is a communication partner through a selection circuit. Further, the I/F circuit transmits and receives learning signals to and from the communication device which is a communication partner. A Step 1 learning circuit, a Step 2 learning circuit, and a Step 3 learning circuit establish link up by using the learning signals. When not receiving a signal from a link detection circuit indicating that link up is established, a reset mask circuit transmits a reset signal generated by a reset signal generation circuit, to the Step 1 learning circuit, the Step 2 learning circuit, and the Step 3 learning circuit to allow them to learn again.

6 Claims, 13 Drawing Sheets

(56) References Cited

U.S. PATENT DOCUMENTS

| | | | |
|---|---|---|---|
| 2015/0304424 A1* | 10/2015 | Lee | H04L 67/125 |
| | | | 709/208 |
| 2016/0004273 A1* | 1/2016 | Chiang | G06F 1/08 |
| | | | 713/501 |
| 2016/0157285 A1* | 6/2016 | Tabata | H04W 56/001 |
| | | | 370/350 |
| 2016/0241694 A1* | 8/2016 | Hashimoto | H04M 1/7253 |
| 2017/0289959 A1* | 10/2017 | Aki | H04L 12/403 |
| 2017/0374588 A1* | 12/2017 | Guo | H04W 24/00 |
| 2019/0025783 A1* | 1/2019 | Tamashima | G05B 19/414 |

* cited by examiner

COMMUNICATION DEVICE, LINK-UP METHOD, AND COMMUNICATION SYSTEM

CROSS-REFERENCE TO RELATED APPLICATIONS

The disclosure of Japanese Patent Application No. 2017-108776 filed on May 31, 2017 including the specification, drawings and abstract is incorporated herein by reference in its entirety.

BACKGROUND

The present invention relates to a communication device, a link-up method, and a communication system.

Ethernet connection is spreading rapidly in the fields of industry. For example, Patent Document 1 (Japanese Unexamined Patent Application Publication No. 2012-74848) describes that link up is established between a node and a switch when a cable is coupled between them. More specifically, Patent Document 1 describes a method of establishing link up by performing data exchange to exchange information of Ethernet (registered trade) standards for industry, in addition to data exchange that is performed in existing Auto-Negotiation, and by selecting the highest priority standard of the matched standards.

SUMMARY

Assuming repeating link down and link up due to periodic replacement of certain devices in a factory or the like, it will take a lot of time to establish link up if Auto Negotiation is performed each time. In addition, various types of devices are assumed to be coupled to each other in a factory or the like. Thus, it is also desirable to guarantee a reliable connection. In other words, it is desirable to establish link up quickly and reliably.

The foregoing and other objects and novel features of the present invention will be apparent from the description of the present specification and the accompanying drawings.

A typical one of the inventions disclosed in the present application is explained in brief as follows.

A communication device according to an embodiment includes: a master/slave information storage unit that stores master/slave information indicating whether the own device is a master device or a slave device; a learning signal transmission/reception unit that transmits and receives learning signals for link up to and from a communication device which is a communication partner; a link-dup unit that establishes link up by learning using learning signals transmitted and received by the learning signal transmission/reception unit to and from the communication device which is a communication partner; and s link-up control unit that allows the link-up unit to learn again when link up is not established by the link-up unit when a first time has elapsed.

According to the exemplary embodiment described above, it is possible to establish link up quickly and reliably.

DETAILED DESCRIPTION

Figure 1:
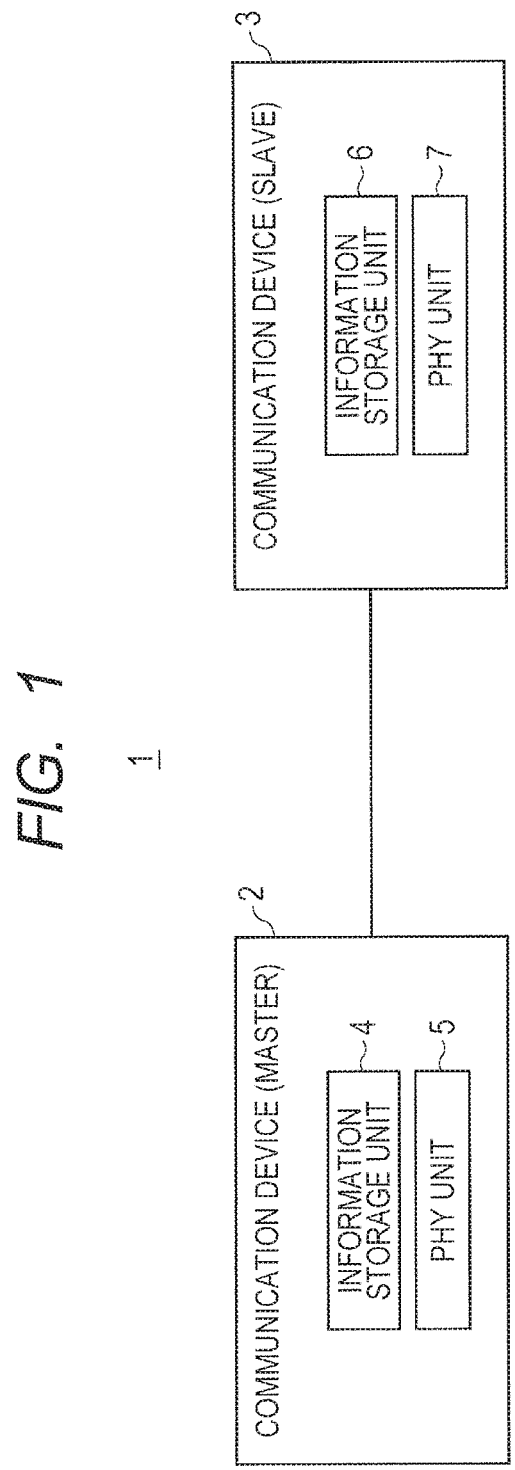
FIG. 1 is a diagram showing an outline of a configuration example of a communication system.

Hereinafter, a preferred embodiment of the present invention will be described in detail with reference to the accompanying drawings. Note that in all the drawings for describing the embodiment below, the same components are, in principle, denoted by the same reference numerals and the repetitive description thereof will be omitted. However, components described accompanied reference numerals in a certain figure may be referred to in descriptions of other figures, although they are not shown again.

System Configuration

FIG. 1 is a diagram showing an outline of a configuration example of a communication system which is an embodiment of the present invention. A communication system 1 of the present embodiment is a system including a communication device 2 (first communication device) which is a master, and a communication device 3 (second communication device) which is a slave. Each of the communication device 2 and the communication device 3 is an Ethernet (registered trademark) communication device. The communication device 2 and the communication device 3 are coupled by a communication cable (LAN cable or the like).

The communication device 2 and the communication device 3 transmit and receive various types of signals to and from each other through the communication cable.

The communication device 2 includes an information storage unit 4 and a PHY unit 5. The information storage unit 4 is a unit that stores information (master/slave information) indicating whether the own device is a master (master device) or a slave (slave device). The communication device 2 is set in advance as a master, and the information storage unit 4 stores information indicating that the communication device 2 is a master. In this way, the information storage unit 4 functions as a master/slave information storage unit. The PHY unit 5 is a unit that transmits and receives data corresponding to the physical layer. Details of the PHY unit 5 will be described later.

The communication device 3 includes an information storage unit 6 and a PHY unit 7. The information storage unit 6 is a unit that stores information indicating whether the own device is a master (master device) or a slave (slave device). The communication device 3 is set in advance as a slave, and the information storage unit 6 stores information indicating that the communication device 3 is a slave. The PHY unit 7 is a unit that transmits and receive s data corresponding to the physical layer. The PHY unit 7 has a configuration similar to that of the PHY unit 5. This will be described later. Note that it is assumed that the PHY unit 5 of the communication device 2 and the PHY unit 7 of the communication device 3 correspond, for example, 1000Base-T which is one of the Ethernet standards. Further, the communication device 2 and the communication device 3 also have a function (link-down detection unit) to detect link down, as well as a function (power-on detection unit) to control power supply of the own device.

As described above, the communication device 2 is set in advance to function as a master and the communication device 3 is set in advance to function as a slave. In this way, it is possible to establish link up only by performing the learning process necessary for establishing link up between the communication device 2 and the communication device 3, by omitting the Auto-Negotiation process to determine that either of the communication devices 2 and 3 is a master and the other is a slave. In other words, it is possible to establish link up quickly. Such link up is hereinafter also referred to as a "fast link up".

As described above, when link up is achieved quickly, it is possible to increase the running time of the communication device 2 and the communication device 3 by the amount of time saved, resulting in an increase in productivity. More specifically, it takes about 2 or 3 seconds to establish link up including the process for determining master and slave, but in the case of fast link up, it is possible to achieve link up in 200 or 300 ms.

Figure 2:
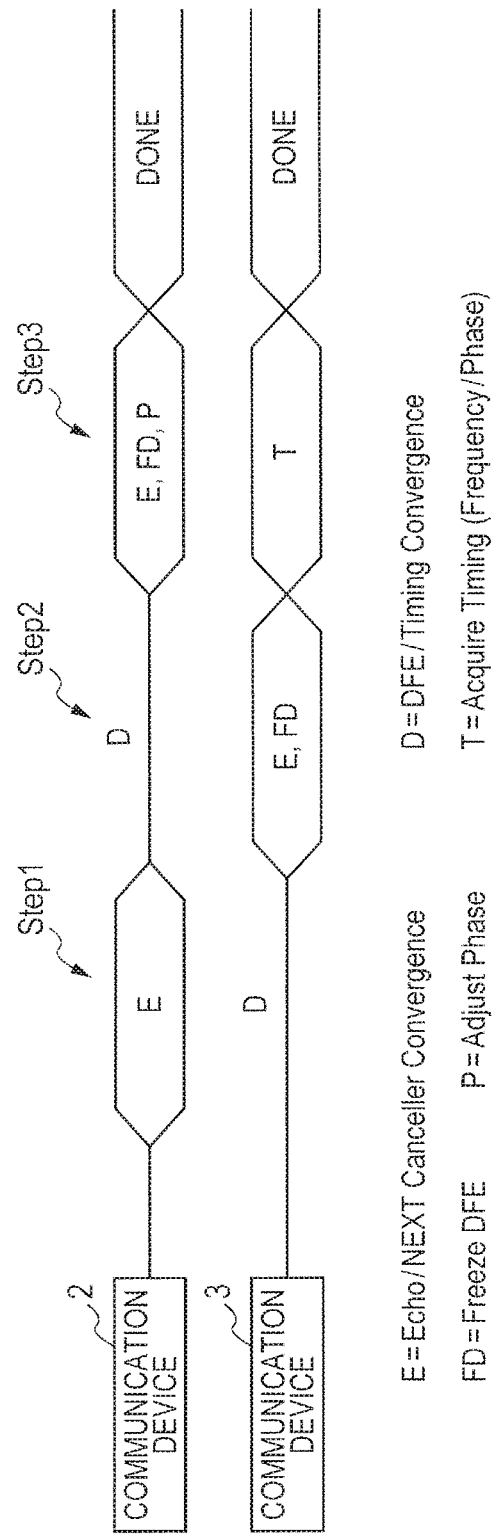
FIG. 2 is a diagram showing an example of the flow of learning process.

Here, the flow of the learning process is described with reference to FIG. 2. FIG. 2 is a diagram showing an example of the flow of the learning process of 1000Base-T. In Step 1 (the communication device 2: E/the communication device 3: D), the communication device 2 outputs an idle signal to the communication device 3, as a learning signal to perform learning of its own Echo and NEXT (Near-End Cross Talk) cancellers. The communication device 3 does not output an idle signal at this timing. However, the communication device 3 receives the idle signal from the communication device 2 to perform DFE (decision feedback equalizer)/timing learning.

Next, Step 2 (the communication device 2: D/the communication device 3: E, FD) replaces the operations of the communication device 2 and the communication device 3 with each other. More specifically, the communication device 2 does not output an idle signal, while the communication device 3 transmits an idle signal to the communication device 3 and the communication device 2 receives the idle signal. Then, each of the communication device 2 and the communication device 3 performs its learning. Next, Step 3 (the communication device 2: E, FD, P/the communication device 3: T) performs integrated learning to establish a link. In other words, link up is completed. The above learning method is described in the document with http://grouper.ieee.org/groups/802/3/tutorial/march98/mick_170398.pdf.

Figure 3:
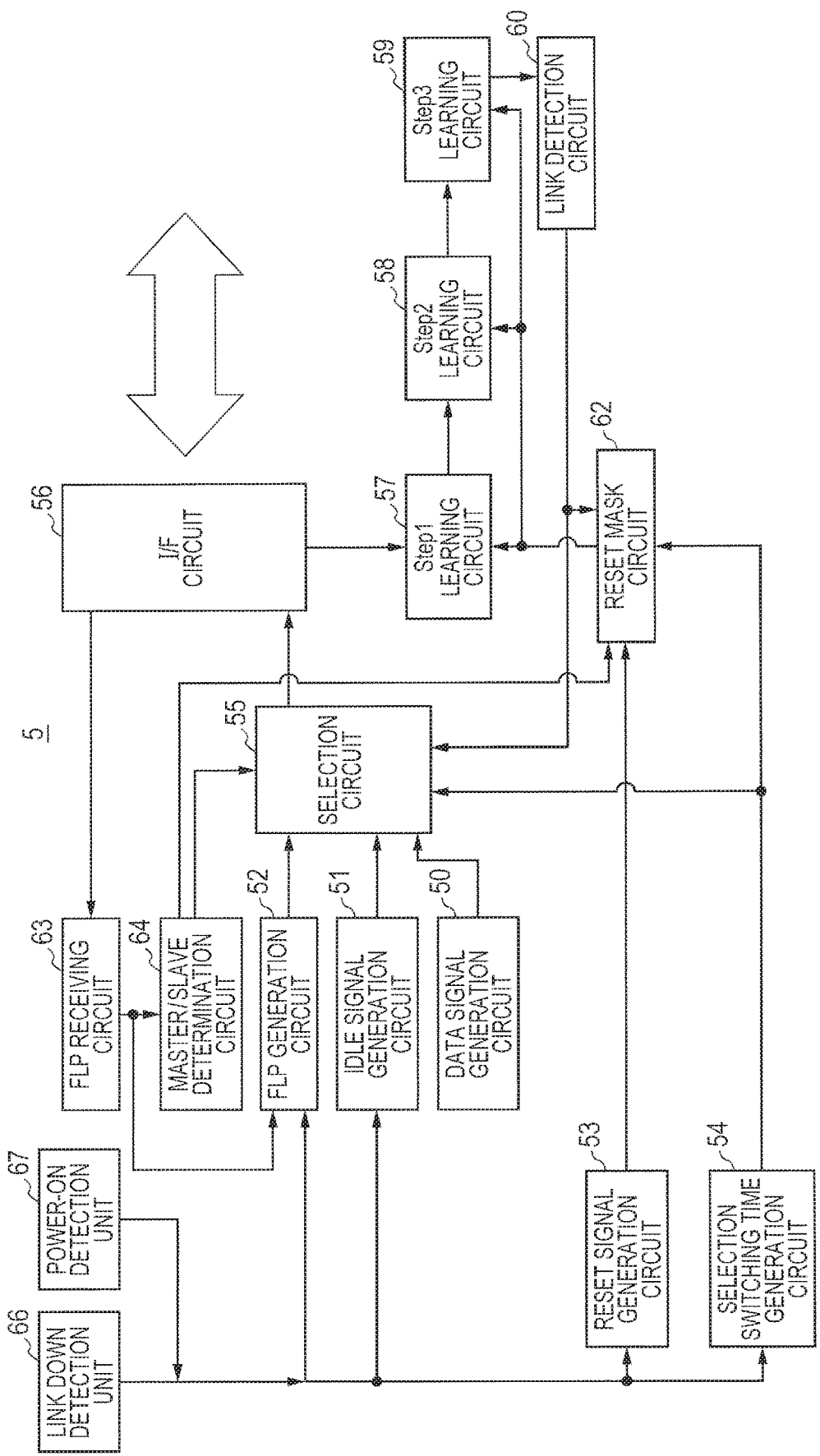
FIG. 3 is a circuit diagram of a PHY unit of a communication device.

Next, details of the PHY unit 5 of the communication device 2 are described with reference to FIG. 3. FIG. 3 is a circuit diagram of the PHY unit 5 of the communication device 2. As shown in FIG. 3, the PHY unit 5 includes a data signal generation circuit 50, an idle signal generation circuit 51, an FLP generation circuit 52, a reset signal generation circuit 53, a selection switching time generation circuit 54, a selection circuit 55, and an I/F circuit 56. Further, the PHY unit 5 also includes a Step 1 learning circuit 57, a Step 2 learning circuit 58, a Step 3 learning circuit 59, a link detection circuit 60, a reset mask circuit 62, an FLP receiving circuit 63, and a master/slave determination circuit 64.

The data signal generation circuit 50 generates a data signal to be transmitted to the communication partner. Then, the data signal generation circuit 50 transmits the data signal to the selection circuit 55.

When the communication device 2 detects link down, or when it detects that the power supply of the communication device 2 is turned on from off, the idle signal generation circuit 51 generates an idle signal as a learning signal for link up. Then, the idle signal generation circuit 51 transmits the idle signal to the selection circuit 55. The phrase "the communication device 2 detects link down" means that the link-down detection unit 66 detects link down by a known method. Further, the phrase "detects that the power supply of the communication device 2 is turned on from off" means that power-on detection unit 67 detects that the power supply of the communication device 2 is turned on from off.

When the communication device 2 detects link down, or when it detects that the power supply of the communication device 2 is turned on from off, the FLP generation circuit 52 transmits an FLP (Fast Link Pulse) signal to the selection circuit 55. The FLP signal is a signal (master/slave determination signal) to determine master and slave with the communication device which is a communication partner.

Further, when the FLP receiving circuit 63 receives the FLP signal from the communication device which is a communication partner through the I/F circuit 56, the FLP generation circuit 52 generates an FLP signal to respond to the received FLP signal. Then, the FLP generation circuit 52 transmits the generated FLP signal to the selection circuit 55.

When the communication device 2 detects link down, or when it detects that the power supply of the communication device 2 is turned on from off, the reset signal generation circuit 53 outputs a reset signal. Subsequently, the reset signal generation circuit 53 measures a reset timing (first time) to output a reset signal at each reset timing.

When the communication device 2 detects link down, or when it detects that the power supply of the communication device 2 is turned on from off, the selection switching time generation circuit 54 starts measuring the selection switching time (second time). When the selection switching time has elapsed, the selection switching time generation circuit 54 transmits a signal indicating that the selection switching time has elapsed, to the reset mask circuit 62. At the same time, the selection switching time generation circuit 54 transmits the signal to the selection circuit 55.

Figure 4:
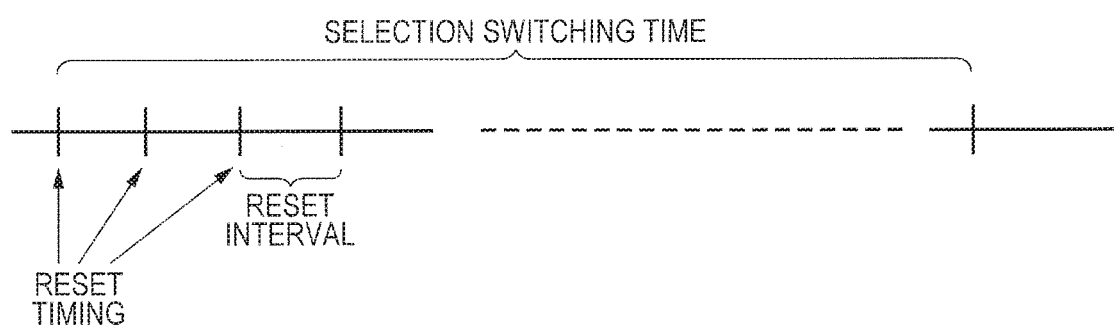
FIG. 4 is a diagram showing the relationship between reset timing and selection switching time.

Here, the relationship between the reset timing and the selection switching time is described with reference to FIG. 4. FIG. 4 is a diagram showing the relationship between the reset timing and the selection switching time. As shown in FIG. 4, when the reset timing has passed several times, the selection switching time has elapsed. In other words, the selection switching time is set to be longer than the interval of the reset timing.

Returning to FIG. 3, the selection circuit 55 is a circuit that selects and outputs any one of the FLP signal, the idle signal, and the data signal. After the communication device 2 detects that the power supply of the communication device 2 is turned on from off, or after the communication device 2 detects link down, the selection circuit 55 selects an idle signal supplied from the idle signal generation circuit 51 and outputs the idle signal to the I/F circuit 56.

Further, when receiving a signal from the selection switching time generation circuit 54 indicating that the selection switching time has elapsed, the selection circuit 55 selects an FLP signal supplied from the FLP generation circuit 52. Then, the selection circuit 55 transmits the FLP signal to the I/F circuit 56. Note that when receiving the FLP signal from the communication device which is a communication partner, the selection circuit 55 selects and outputs the FLP signal generated by the FLP generation circuit 52 in order to respond to the FLP signal. Further, when receiving a signal indicating that the master or slave is determined by the master/slave determination circuit 64 after exchanging FLP signals with the communication partner, the selection circuit 55 selects and outputs an idle signal. Further, when receiving a signal indicating that the link detection circuit 60 detects link up, the selection circuit 55 selects a data signal generated by the data signal generation circuit 50, and transmits the data signal to the I/F circuit 56.

The I/F circuit 56 is an interface unit for transmitting and receiving signals to and from another communication device (for example, the communication device 3). The I/F circuit 56 receives the FLP signal, the idle signal, or the data signal from the selection circuit 55, and transmits the signals to another communication device. Similarly, the I/F circuit 56 receives the FLP signal, the idle signal, or the data signal from another communication device. In this way, the I/F circuit 56 functions as a master/slave determination signal reception unit and a master/slave determination signal transmission unit.

Further, when receiving learning signals from the own device and another communication device, the I/F circuit 56 transmits the signals to the Step 2 learning circuit 57, the Step 2 learning circuit 58, and the Step 3 learning circuit 59. In this way, the I/F circuit 56 transmits and receives learning signals to and from another communication device. In other words, the I/F circuit 56 also functions as a learning signal transmission/reception unit.

The Step 1 learning circuit 57 is a unit that performs the learning process of Step 1 shown in FIG. 2. The Step 1 learning circuit 57 performs learning of its own Echo and Next cancellers by using the idle signal transmitted from the I/F circuit 56. After the learning is completed, the Step 1 learning circuit 57 notifies the Step 2 learning circuit 58 of the completion of the learning.

The Step 2 learning circuit 58 is a unit that performs the learning process of Step 2 shown in FIG. 2. The Step 2 learning circuit 58 performs DFE/Timing learning by using the idle signal received from the communication device 3 through the I/F circuit 56. After the learning is completed, the Step 2 learning circuit 58 notifies the Step 3 learning circuit 59 of the completion of the learning.

The Step 3 learning circuit 59 is a unit that performs the learning process of Step 3 shown in FIG. 2. The Step 3 learning circuit 59 adjusts the Echo/Next cancellers and the phase while holding the learned DFE. When the learning is completed, the Step 3 learning circuit 59 notifies the link detection circuit 60. In this way, the Step 1 learning circuit 57, the Step 2 learning circuit 58, and the Step 3 learning circuit 59 try to establish link up by learning using the idle signals received from the own device and the communication device 3 through the I/F circuit 56. In other words, the Step 1 learning circuit 57, the Step 2 learning circuit 58, and the Step 3 learning circuit 59 function as a link-up unit. Further, the Step 1 learning circuit 57, the Step 2 learning circuit 58, and the Step 3 learning circuit 59 try to establish link up by using the idle signal transmitted from the I/F circuit 56, after the master/slave determination circuit 64 determines master or slave by transmitting and receiving FLP signals.

The link detection circuit 60 is a unit that detects that link up is achieved by receiving a notification from the Step 3 learning circuit 59 indicating that the learning is completed. When receiving a notification from the Step 3 learning circuit 59 indicating that the learning is completed, the link detection circuit 60 transmits the notification of completion of the learning to the selection circuit 55 and the reset mask circuit 62.

The reset mask circuit 62 is a unit that controls whether or not the reset signal received from the reset signal generation circuit 53 is transmitted to the Step 1 learning circuit 57, the Step 2 learning circuit 58, and the Step 3 learning circuit 59.

When receiving a signal from the selection switching time generation circuit 54 indicating that the selection switching time has elapsed, or when receiving a signal from the master/slave determination circuit 64, or when link up is detected, the reset mask circuit 62 performs a mask process on the reset signal supplied from the reset signal generation circuit 53 so that the reset signal is not transmitted to the Step 1 learning circuit 57, the Step 2 learning circuit 58, and the Step 3 learning circuit 59.

On the other hand, the reset mask circuit 62 transmits the reset signal supplied from the reset signal generation circuit 53 to the Step 1 learning circuit 57, the Step 2 learning circuit 58, and the Step 3 learning circuit 59, at each reset timing until link up is detected if it is within the selection switching time indicated by the selection switching time generation circuit 54. In other words, the Step 1 learning circuit 57, the Step 2 learning circuit 58, and the Step 3 learning circuit 59 learn again in response to the reset signal, respectively, until link up is detected within the selection switching time. In this way, the reset mask circuit 62 functions as a link-up control unit.

The FLP receiving circuit 63 is a unit that receives an FLP signal through the I/F circuit. When receiving an FLP signal from the communication partner device, the FLP receiving circuit 63 transmits the FLP signal to the master/slave determination circuit 64.

The master/slave determination circuit 64 is a unit that determines whether the own device is set as a master or slave based on the FLP signal received from the communication partner device. The master/slave determination circuit 64 determines whether the own device is set as a master or slave based on the FLP signal received from the FLP receiving circuit 63. The method for determining master or slave by using the FLP signal can be implemented by known methods. Further, the master/slave determination circuit 64 notifies the selection circuit 55 of the reception of the FLP signal. At the same time, the master/slave determination circuit 64 transmits a signal indicating that master or slave is (determined by the master/slave determination circuit 64, to the reset mask circuit 62. In this way, the master/slave determination circuit 64 functions as a determination unit.

Note that the PHY unit 7 of the communication device 3, which is a slave, is different from the PHY unit 5 of the communication device 2 in that the PHY unit 7 first waits for reception of an idle signal from the communication partner when the communication device 3 detects link down or when it detects that the power supply of the communication device 3 is turned on from off.

Further, the communication device 3 also has circuits corresponding to the Step 1 learning circuit 57, Step 2 learning circuit 58, and Step 3 learning circuit 59 of the communication device 2. The learning circuit corresponding to the Step 1 learning circuit performs DFT/Timing learning, the learning circuit corresponding to the Step 2 learning circuit 58 performs learning of its own Echo and NEXT cancellers while holding the learned DFE, and the learning circuit corresponding to the Step 3 learning circuit 59 performs the frequency/phase adjustment. Other configurations are the same as those of the PHY unit 5 of the communication device 2.

In other words, the I/F circuit 56 of the communication device 3 transmits and receives idle signals to and from the own device and the communication device 2 as learning signals. In this way, the I/F circuit 56 of the communication device 3 functions as a learning signal transmission/reception unit. Then, the Step 1 learning circuit 57, Step 2 learning circuit 58, and Step 3 learning circuit 59 of the communication device 3 learn using the learning signals to establish link up.

OPERATION EXAMPLE

First Operation Example

Figure 5:
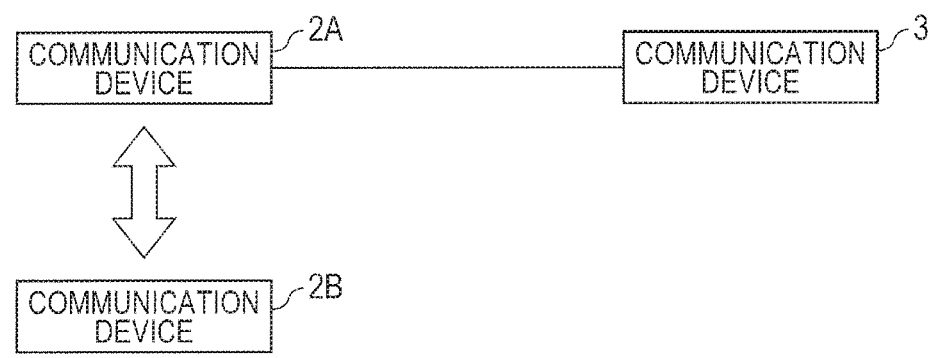
FIG. 5 is a diagram showing an example of establishing link up between communication devices in a first operation example.

Next, a description will be given of an operation example that two communication devices establish link up. FIG. 5 is a diagram showing an example of establishing link up between communication devices in a first operation example. More specifically, this is an example of replacing a communication device 2A which is master coupled to the communication device 3 which is slave, with a communication device 2B. In this case, the communication device 3 which is slave detects link down at the time of replacement. At this timing, the idle signal generation circuit 51 of the communication device 3 generates an idle signal and transmits the idle signal to the selection circuit 55. Further, the FLP generation circuit 52 of the communication device 3 transmits an FLP signal to the selection circuit 55. The selection circuit 55 of the communication device 3 receives the idle signal and the FLP signal. However, the selection circuit 55 neither select nor output both signals until receiving an idle signal from the communication partner.

After the communication device 3 which is slave and the communication device 2B which is master are coupled through a cable, the power supply of the communication device 2B is turned on. At this timing, the idle signal generation circuit 51 of the communication device 2B generates an idle signal and transmits the idle signal to the selection circuit 55. Further, the FLP generation circuit 52 of the communication device 2B transmits an FLP signal to the selection circuit 55. The selection circuit 55 of the communication device 2B selects an idle signal. Then, the I/F circuit 56 transmits the idle signal to the communication device 3. Further, the learning circuits of the communication device 2B (Step 1 learning circuit 57, Step 2 learning circuit 58, and Step 3 learning circuit 59) perform learning. Further, the learning circuits of the communication device 3 also perform learning using the idle signal from the communication device 2B. In this way, the communication device 2B and the communication device 3 can be linked up with each other. In this case, the timing that the communication device 3 which is slave detects link down is earlier than when the power supply of the communication device 2B which is master is turned ON. For this reason, the communication device 3 which is slave can wait for the idle signal transmitted from the communication device 2B which is master. Thus, the communication device 2B and the communication device 3 can be linked up quickly and reliably.

Figure 6:
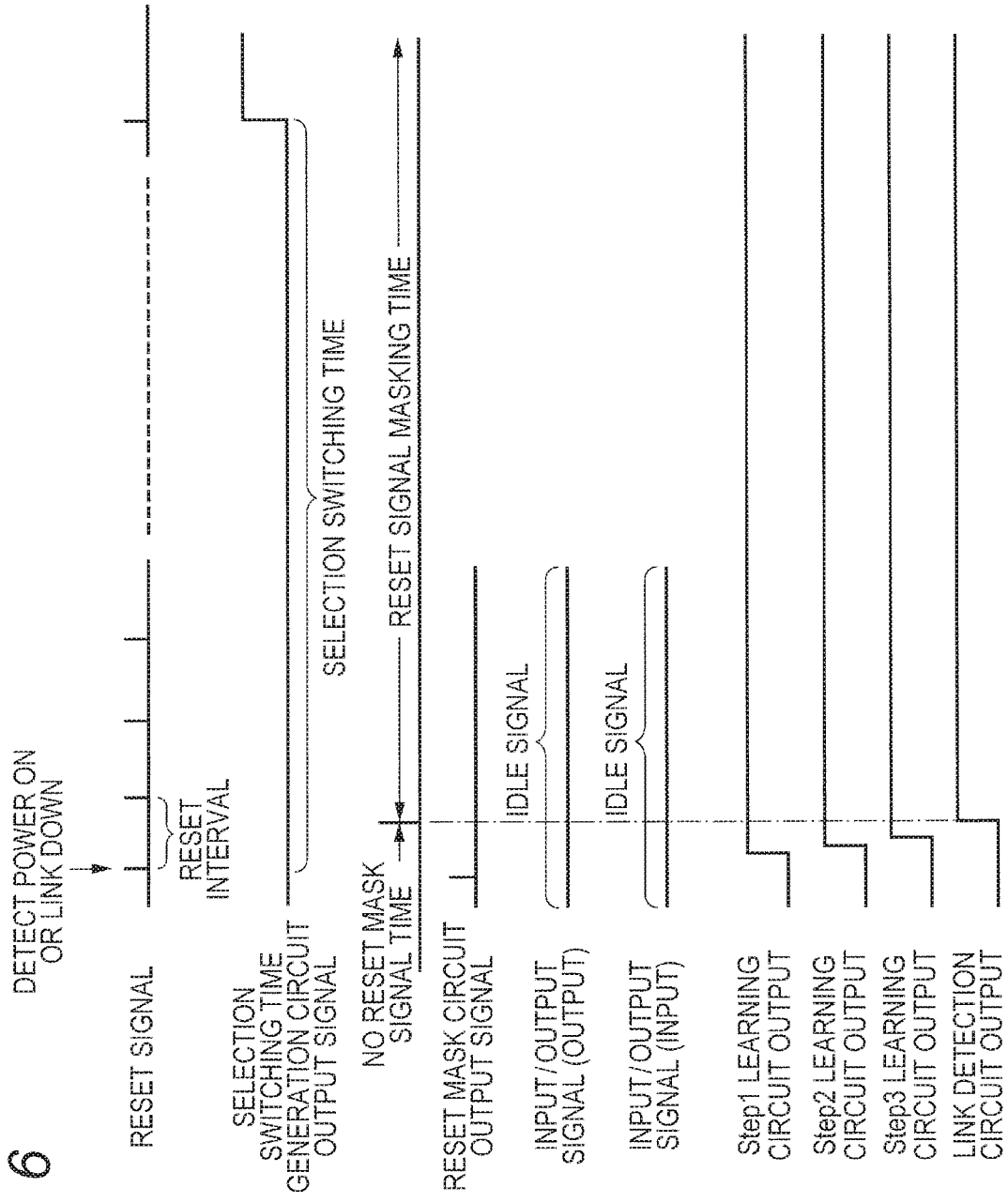
FIG. 6 is a diagram showing an example of signal outputs of a communication device in the first operation example.

FIG. 6 is a diagram showing an example of signal outputs of a communication device in the first operation example. More specifically, FIG. 6 is a diagram showing an example of signal outputs in the communication device 2B which is master. The reset signal shown in FIG. 6 indicates reset timing measured by the reset signal generation circuit 53. The selection switching tame generation circuit output signal shown in FIG. 6 is a signal output from the selection signal time generation circuit 54. The no reset mask signal time shown in FIG. 6 is the period when no mask is set by the reset mask circuit 62, while the reset signal masking time shown in FIG. 6 is the period when a mask process is performed by the reset mask circuit 62. The reset mask circuit output signal shown in FIG. 6 is a signal output from the reset mask circuit 62. The input/output signal (output) shown in FIG. 6 is a signal output from the I/F circuit 56. The input/output signal (input) shown in FIG. 6 is a signal input by the I/F circuit 56.

The Step 1 learning circuit output shown in FIG. 6 is a learning completion signal output by the Step 1 learning circuit 57. The Step 2 learning circuit output shown in FIG. 6 is a learning completion signal output by the Step 2 learning circuit 58. The Step 3 learning circuit output shown in FIG. 6 is a learning completion signal output by the Step 3 learning circuit 59. The link detection circuit output shown in FIG. 6 is a link completion signal output by the link detection circuit 60.

As shown in FIG. 6, after the reset signal generation circuit 53 outputs a first reset signal associated with detection of power on or link down and before outputting a second reset signal, the I/F circuit 56 outputs an idle signal as a learning signal, and then receives an idle signal corresponding to the particular idle signal from the communication device 3. In this way, the learning of Step 1 to Step 3 is properly completed and link up is completed before the reset signal generation circuit 53 outputs a reset signal. Accordingly, the reset mask circuit 62 masks the reset signal. Thus, as shown in the reset masked circuit output reset in FIG. 6, the reset mask circuit 62 does not output the reset signal.

Second Operation Example

Figure 7:
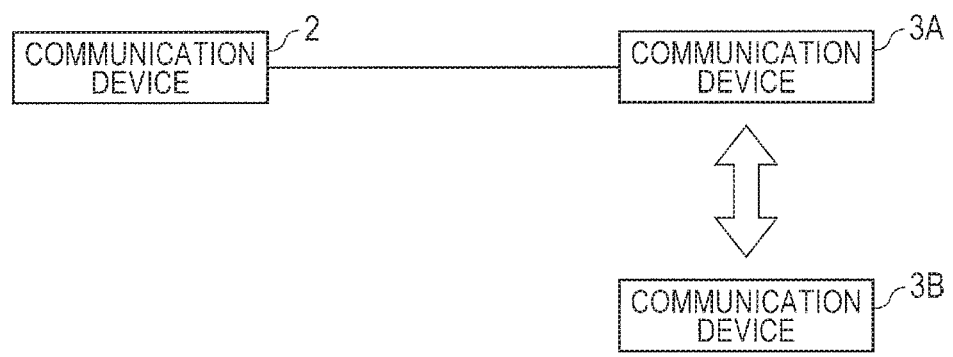
FIG. 7 is a diagram showing an example of establishing link up between communication devises in a second operation example.

FIG. 7 is a diagram showing an example of establishing link up between communication devices in a second operation example. More specifically, FIG. 7 is a diagram showing an example of replacing the communication device 3A which is a salve device coupled to the communication device 2 which is a master device, with the communication device 3B.

In this case, the communication device 2 detects link down at the time of replacement. At this timing, the idle signal generation circuit 51 of the communication device 2 generates an idle signal and transmits the idle signal to the selection circuit 55. Further, in response to the detection of link down, the reset signal generation circuit 53 outputs a rest signal and starts measuring the reset timing. Similarly, the selection switching time generation circuit 54 starts measuring the selection switching time. At this time, the selection circuit 55 does not receive a signal indicating that the selection switching time has elapsed. Thus, the selection circuit 55 selects an idle signal and outputs the idle signal to the I/F circuit 56. As a result, the idle signal is transmitted to the communication device 3B which is slave to be newly coupled. However, at this time, the communication device 3B which is slave is not coupled or the power supply is not turned on, so that the communication device 3B is not able to receive the idle signal. As a result, the learning is started only in the communication device 2 and the learning is not started in the communication device 3B. In other words, the learning is not properly processed in both the communication devices.

Thus, after the reset timing has elapsed, the communication device 2 which is master performs the learning process again, in response to the reset signal output from the reset signal generation circuit 53 of the communication device 2. In this way, even if power on is delayed in the communication device 3B, the learning can be started again, so that the learning is properly processed in both the communication devices. Note that it is assumed that the reset time is longer than time for performing the learning.

Figure 8:
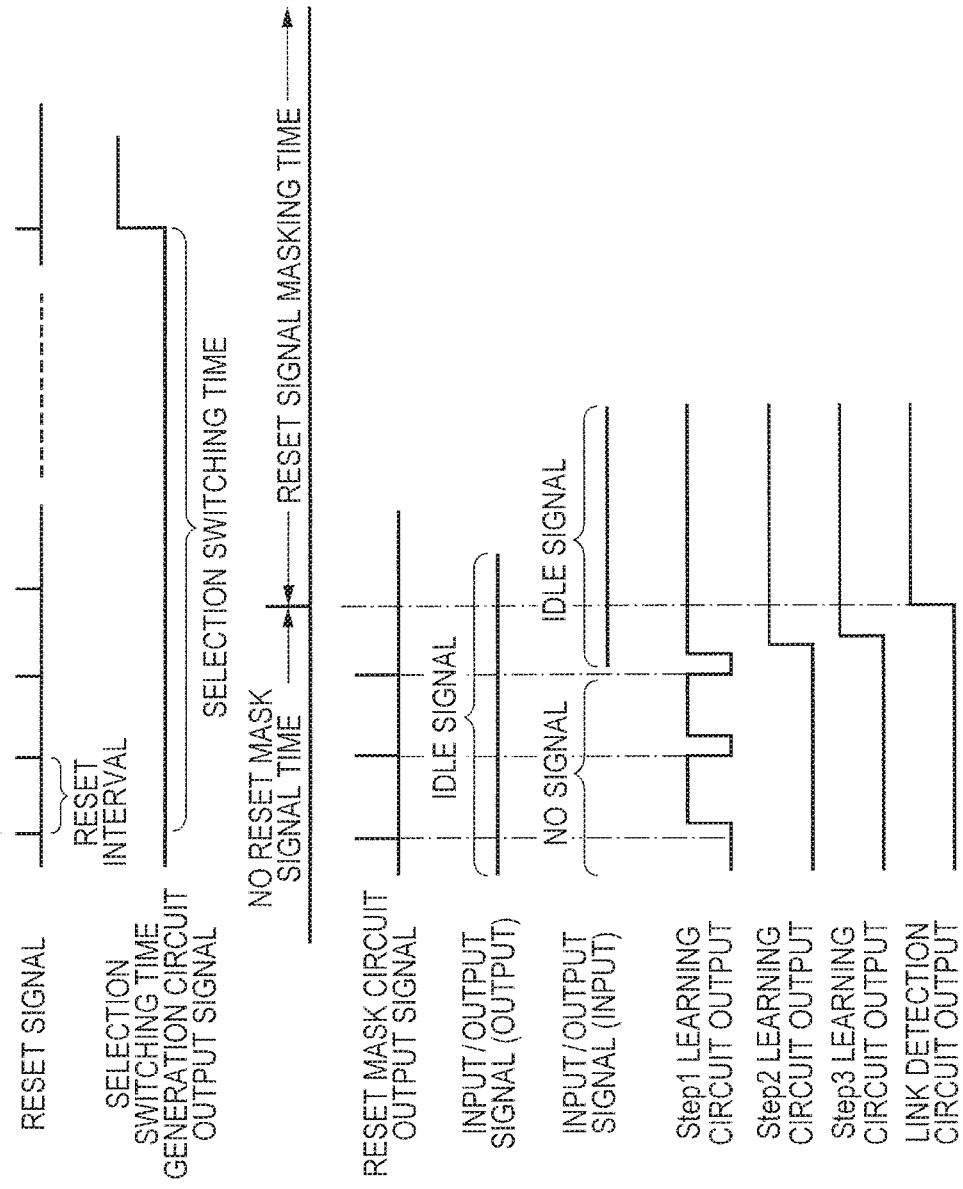
FIG. 8 is a diagram showing an example of signal outputs of a communication device in the second operation example.

Here, an example of signal outputs of the communication device 2 which is master is described with reference to FIG. 8. FIG. 8 is a diagram showing an example of signal outputs of the communication device in the second operation example. More specifically, FIG. 8 is a diagram showing an example of signal outputs of the communication device 2 when the power supply of the communication device 3B which is slave is turned on during the period when the communication device 2 performs learning again. When the communication device 2 detects link down, the power supply of the communication device 3B is not turned on. Thus, the communication device 3B is not able to receive the idle signal transmitted from the communication device 2. In the example of FIG. 8, the communication device 2 does not receive the idle signal from the communication device 3B at the time when the reset signal is generated three times.

Note that the reason why the communication device 2 repeatedly outputs reset signals is that the master and slave communication devices must start up to allow the Step 1 learning circuit 57, the Step 2 learning circuit 58, and the Step 3 learning circuit 59 to perform the learning process in a series of steps. In FIG. 8, the communication device 2 restarts learning process repeatedly because the idle signal from the communication device 3B is not input to the communication device 2.

The communication device 2 may not properly complete the learning process unless receiving an idle signal from the communication device 3B, so that a signal indicating that link up is established is not output from the link detection circuit 60. Thus, as shown in FIG. 8, the reset mask circuit 62 outputs the reset signal as it is received from the reset signal generation circuit 53, to the Step 1 learning circuit 57, the Step 2 learning circuit 58, and the Step 3 learning circuit 59. After that, the power supply of the communication device 3 is turned on, so that an idle signal is transmitted from the communication device 3 and learning is completed in each of the learning circuits. When receiving a signal from the link detection circuit 60 indicating that link up is established, the reset mask circuit 62 performs a mask process on the reset signal from the reset signal generation circuit 53.

Note that the reset mask circuit 62 of the communication device 2 transmits a reset signal until just before the selection switching time has elapsed. This is because considering the case in which a communication device other than the communication device 3, which is set in advance as slave, is coupled. When the selection switching time has elapsed, the communication device 2 transmits an FLP signal.

Figure 9:
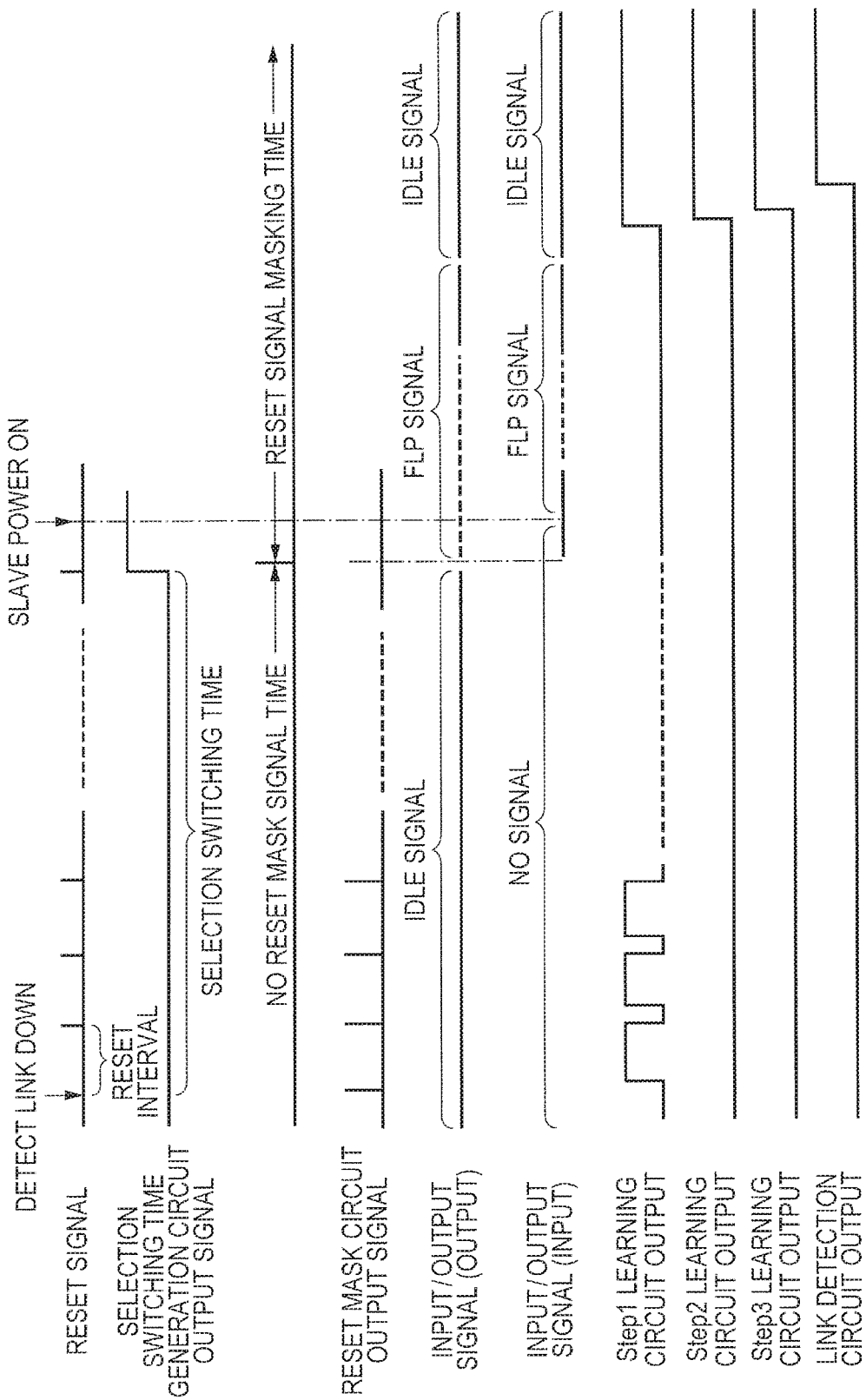
FIG. 9 is a diagram showing another example of signal outputs of the communication device in the second operation example.

Here, FIG. 9 is a diagram showing another example of signal outputs of a communication device in the second operation example. More specifically, FIG. 9 is a diagram showing an example of signal outputs when the power supply of the communication device 3B which is slave is turned on when the selection switching time has elapsed after the communication device 2 which is master has detected link down. As shown in the reset mask circuit output signal in FIG. 9, the reset mask circuit 62 of the communication device 2 outputs reset signals to the Step 1 learning circuit 57, the Step 2 learning circuit 58, and the Step 3 learning circuit 59 until the selection switching time has elapsed.

In this way, the communication device 2 allows the Step 1 learning circuit 57, the Step 2 learning circuit 58, and the Step 3 learning circuit 59 to perform the learning process repeatedly. When the selection switching time has elapsed, the selection circuit 55 of the communication device 2 selects an FLP signal. Then, the selection circuit 55 transmits the FLP signal to the communication device 3B. Further, the selection switching time generation circuit 54 of the communication device 2 transmits a signal indicating that the selection switching time has elapsed, to the reset mask circuit 62. In response to this signal, the reset mask circuit 62 performs a mask process on the reset signal. The communication device 3B receives the FLP signal, and in response to the reception of the FLP signal, transmits the FLP signal to the communication device 2. The communication device 2 and the communication device 3B transmit and receive FLP signals from and to each other, to determine which device is to be master. Then, after the master is determined, the master device transmits an idle signal, and the learning is started.

Third Operation Example

Figure 10:
FIG. 10 is a diagram showing an example of establishing link up between communication devices in a third operation example.

The case of replacing the communication devices has been described with reference to FIGS. 5 and 7. A third operation example describes, with reference to FIG. 10, the case in which when the communication device 2 which is master and the communication device 3 which is slave are coupled, the power supply of one communication device is turned off and turned on again, and in which the power supplies are turned on with a time lag. FIG. 10 is a diagram showing an example of establishing link up between two communication devices in the third operation example.

In the state shown in FIG. 10, when the power supply of the communication device 2 is turned on later, the communication device 3 is ready to receive an idle signal before the communication device 2 is powered on, similarly to the case shown in FIG. 6. Thus, the communication device 3 performs learning based on the idle signal transmitted from the communication device 2.

Further, in the state shown in FIG. 10, when the communication device 3 is powered on later, the communication device 2 repeats learning during a predetermined time after link down is detected. When the learning is completed before the selection switching time elapses, the two communication devices complete the learning without transmitting and receiving FLP signals. When the learning is completed after the selection switching time has elapsed, the two communication devices perform learning after transmitting and receiving FLP signals to determine which communication device is master.

Note that the description focuses on the case in which the cable is coupled to the communication device 2 and the communication device 3 again after the cable is removed when the communication device 2 and the communication device 3 are powered on. The communication device 2 transmits reset signals at each reset timing until the selection switching time has elapsed after link down (after the cable is removed), and repeats learning. When the selection switch time has elapsed, the communication device 2 transmits an FLP signal. The communication device 3 waits for receiving the idle signal from the communication device 2 until the selection switching time has elapsed from link down. When the selection switching time has elapsed, the communication device 3 transits an FLP signal.

Fourth Operation Example

Figure 11:
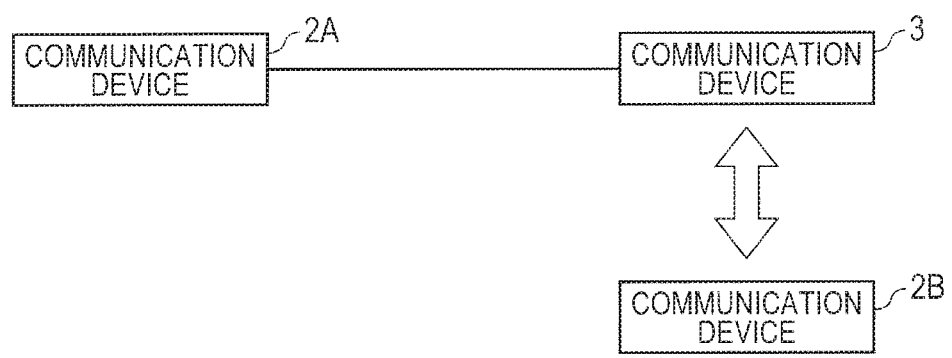
FIG. 11 is a diagram showing an example of establishing link up between communication devices in a fourth operation example.

FIG. 11 is a diagram showing an example of establishing link up between communication devices in a fourth operation example. More specifically, FIG. 11 is a diagram showing an example that when the communication device 2A set as master and the communication device 3 set as slave are coupled, the communication device 3 and the communication device 2B, which is set as master, are replaced with each other. In this case, both communication devices are coupled to the communication device set as master. Thus, both communication devices transmit idle signals which are learning signals and learning does not take place. As a result, the learning is repeatedly re-executed by reset signals in both communication devices, during which non-link up state continues during this time. However, after the selection switching time has elapsed, either one of the communication device 2A and the communication device 2B transmits an FLP signal. Then, the other communication device receives the FLP signal and transmits an FLP signal corresponding to the received FLP signal. In this way, the communication device 2A or the communication device 2B can be reset as master and the other communication device can be reset as slave. After that, it is possible to establish link up by learning in both communication devices.

Fifth Operation Example

Figure 12:
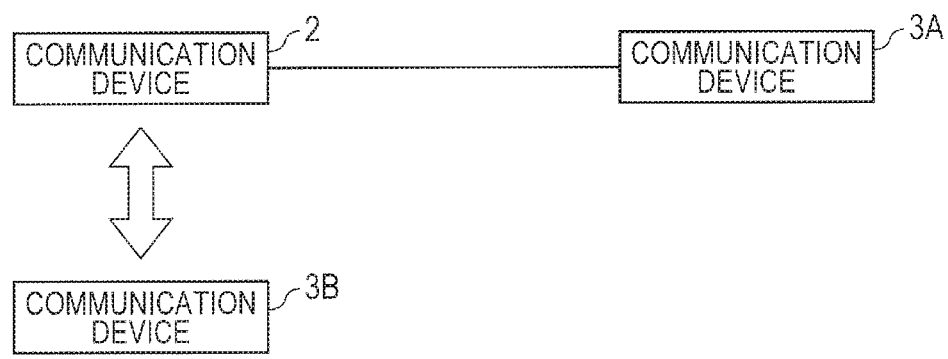
FIG. 12 is a diagram showing an example of establishing link up between communication devices in a fifth operation example.

FIG. 12 is a diagram showing an example of establishing link up between communication devices in a fifth operation example. More specifically, FIG. 12 shows an example of a case in which when the communication device 2 set as master and the communication device 3A set as slave are coupled, the communication device 2 set as master and the communication device 3B, which is set in advance as slave, are replaced with each other. In this case, the communication devices, both of which are set as slave, are coupled to each other. In this case, both devices wait for receiving of an idle signal which is a learning signal, and so either of them do not transmit a learning signal that the master must transmit. Thus, non-link up state continues. However, after the selection switching time has elapsed, either one of the communication devices 3A and 3B transmits an FLP signal. Then, the other communication device receives the FLP signal and transmits an FLP signal corresponding to the received FLP signal. In this way, it is possible to reset one of the communication devices 3A and 3B as master and the other as slave. After that, both communication devices perform learning to establish link up.

Sixth Operation Example

Figure 13:
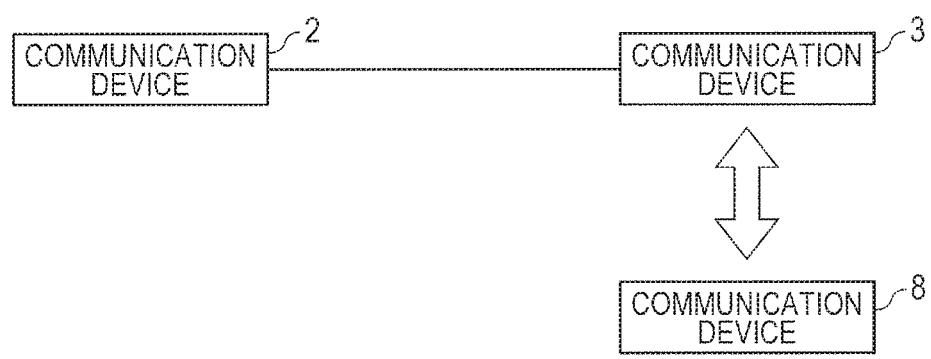
FIG. 13 is a diagram showing an example of establishing link up between communication devices in a sixth operation example.

FIG. 13 is a diagram showing an example of establishing link up between communication devices in a sixth operation example. More specifically, FIG. 13 shows an example of a case in which when the communication device 2 set as master and the communication device 3 set as slave are coupled in the initial state, the communication device 3 and a communication device 8 are replaced with each other. The communication device 8 is a communication device in which the setting necessary to determine master and slave is not made, which transmits an FLP signal when coupled to another communication device. When link down occurs or power is on, the communication device 8 transmits an FLP signal. As shown in FIG. 13, when the communication device 3 is replaced with the communication device 8, the communication device 2 detects link down and transmits an idle signal. After the replacement is done, the communication device 8 transmits an FLP signal. When receiving the FLP signal, the communication device 2 generates an FLP signal corresponding to the received FLP signal. Then, the communication device 2 transmits the generated FLP signal to the communication device 8. In this way, one of the communication devices 2 and 8 is set as master and the other is set as slave. After that, both communication devices perform learning to establish link up.

Figure 14:
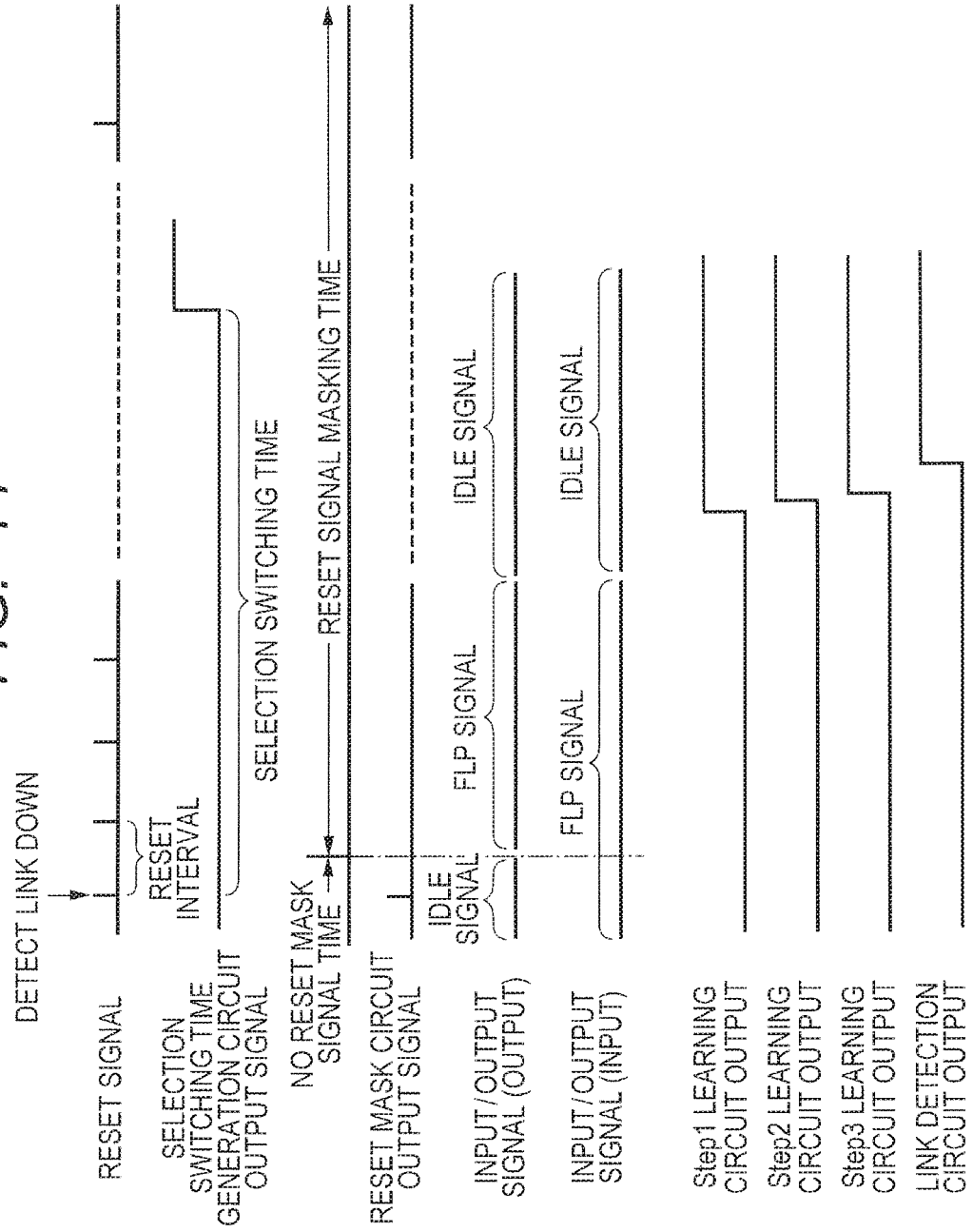
FIG. 14 is a diagram showing signal outputs of the communication devise in the sixth operation example.

FIG. 14 is a diagram showing an example of signal outputs of a communication device in the sixth operation example. More specifically, FIG. 14 is a diagram showing an example of signal outputs of the communication device 2 when the communication device 3 and the communication device 8 are replaced with each other. As shown in FIG. 14, the communication device 2 initially transmits an idle signal. However, when receiving an FLP signal from the communication device 8, the communication device 2 also transmits an FLP signal corresponding to the received FLP. Further, the reset mask circuit 62 receives an FLP signal from the master/slave determination circuit 64, and performs a mask process in response to the reception of the FLP signal.

In this way, the communication device 2 and the communication device 8 transmit and receive FLP signals to and from each other to determine which device is master. After the master is determined, the device determined as master transmits an idle signal and then both communication devices start learning.

Seventh Operation Example

Figure 15:
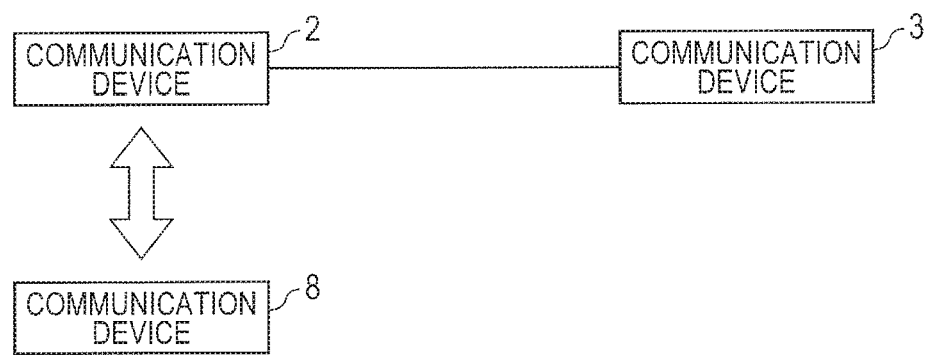
FIG. 15 is a diagram showing an example of establishing link up between communication devices in a seventh operation example.

FIG. 15 is a diagram showing an example of establishing link up between communication devices in a seventh operation example. More specifically, FIG. 15 shows an example of a case in which when the communication device 2 set as master and the communication device 3 set as slave are coupled to each other, the communication device 2 and the communication device 8 are replaced with each other. In this case also, similar to the sixth operation example, it is possible to establish link up by determining one of the communication devices 3 and 8 as master based on the FLP signal transmitted from the communication device 8.

Eighth Operation Example

Figure 16:
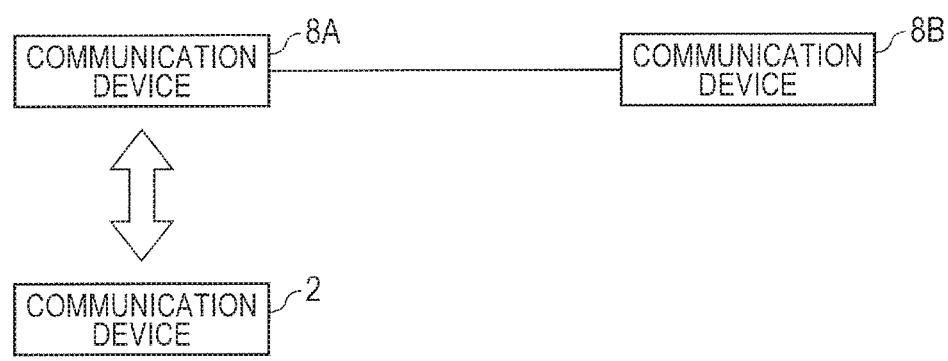
FIG. 16 is a diagram showing an example of establishing link up between communication devices in an eighth operation example.

FIG. 16 is a diagram showing an example of establishing link up between communication devices in an eighth operation example. More specifically, FIG. 16 shows an example of a case in which when a communication device 8A and a communication device 8B are coupled to each other, the communication device 8A and the communication device 2 are replaced with each other. In this case also, it is possible to establish link up by determining one of the communication devices 2 and 8B as master based on the FLP signal transmitted from the communication device 8B.

Ninth Operation Example

Figure 17:
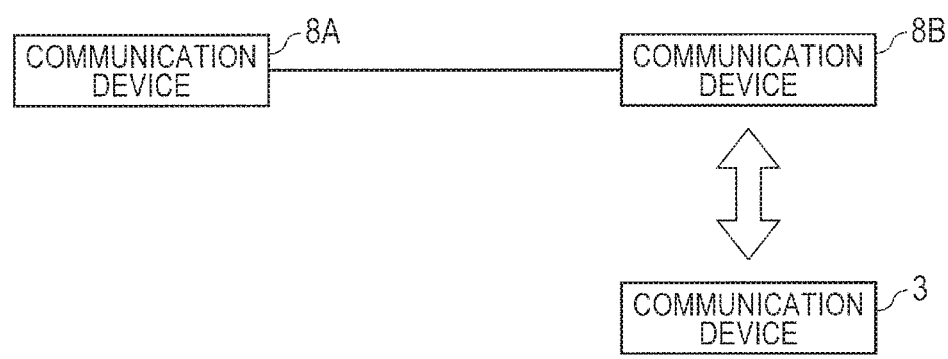
FIG. 17 is a diagram showing an example of establishing link up between communication devices in a ninth operation example.

FIG. 17 is a diagram showing an example of establishing link up between communication devices in a ninth operation example. More specifically, FIG. 17 shows an example of a case in which when the communication device 8A and the communication device 8B are coupled to each other, the commination device 8B and the communication device 3 are replaced with each other. In this case also, similar to the sixth operation example, it is possible to establish link up by determining one of the communication devices 3 and 8A as master based on the FLP signal transmitted from the communication device 8A.

Flow of Processing

Figure 18:
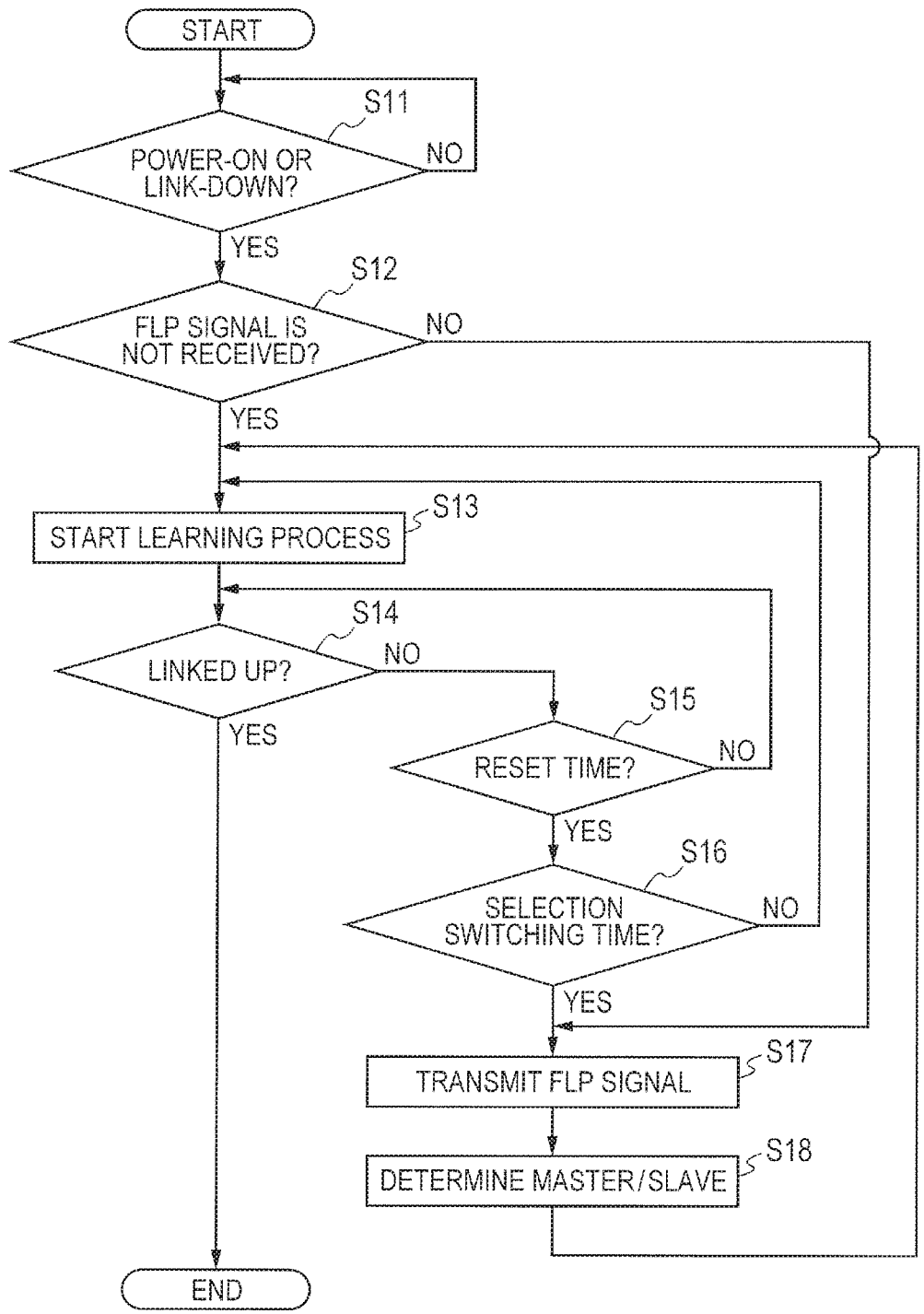
FIG. 18 is a diagram showing an outline of an example of the flow of link-up process in a communication device according to an embodiment of the present invention.

FIG. 18 is a diagram showing an outline of an example of the flow of link-up process in the communication device 2 according to the present embodiment. First, when the communication device 2 detects power on or link down (S11: YES), and when the communication device 2 does not receive an FLP signal from the communication partner device (S12: YES), the idle signal generation circuit 51 generates an idle signal. Further, the I/F circuit 56 transmits the idle signal to the communication partner device through the selection circuit 55. Then, the Step 1 learning circuit 57, the Step 2 learning circuit 58, and the Step 3 learning circuit 59 start the learning process (S13). When the link detection circuit 60 detects that link up is established by the learning process (S14: YES), the communication device 2 ends the process.

When the link detection circuit 60 does not detect that link up is established (S14: NO), and when the reset timing (reset time) has not elapsed (S15: NO), the communication device 2 waits for the reset time. Note that at this point, one of the Step 1 learning circuit 57, the Step 2 learning circuit 58, and the Step 3 learning circuit 59 continues the learning process. When the reset signal generation circuit 53 transmits a reset signal (S15: YES), and when the selection switching time has not elapsed (S16: NO), the process proceeds to S13 to perform again the learning process.

Further, when the selection switching time has elapsed (S16: YES), the I/F circuit 56 transmits an FLP signal to the communication partner device through the selection circuit 55 (S17), and the master/slave determination circuit 64 determines mater and slave with the communication partner device (S18) Then, the process proceeds to Step S12. Further, in Step S12, when receiving an FLP signal from the communication partner device (S12: NO), the FLP generation circuit 52 generate an FLP signal corresponding to the received FLP signal. Further, the I/F circuit 56 transmits the generated FLP signal to the communication partner device (S17), and the master/slave determination circuit 64 determines master and slave with the communication partner device (S18). Then, the process proceeds to Step S13. When the process proceeds to Step S13 through Step S17, NO is selected in Step S15 because the reset timing is masked by the reset mask circuit 62.

Note that the timing to determine whether or not the FLP signal is received from the communication partner device may be timing other than the timing described above. For example, this may be before Step S15.

Functional Effect

As described above, in the communication device 2, the information storage unit 4 stores information indicating that the communication device 2 is master. Further, when the communication device 2 detects power on or link down, the idle signal generation circuit 51 generates an idle signal, and the I/F circuit 56 transmits the idle signal to the communication device which is a communication partner (for example, the communication device 3) through the selection circuit 55. Further the I/F circuit 56 transmits and receives learning signals to and from the communication device which is a communication partner. The Step 1 learning circuit 57, the Step 2 learning circuit 58, and the Step 3 learning circuit 59 establish link up by using learning signals. When a signal indicating that the link up is established is not received from the link detection circuit 60, the reset mask circuit 62 transmits a reset signal, which is generated by the reset signal generation circuit 53, to the Step 1 learning circuit 57, the Step 2 learning circuit 58, and the Step 3 learning circuit 59 to allow them to learn again.

In this way, the communication device 2 stores in advance the information indicating that the own device is either a master device or a slave device, and in principle allowing for establishment of link up by using the stored information. In this way, the communication device 2 can perform link up early by omitting the process of determining a master device and a slave device.

Further, when link up is not established by the Step 1 learning circuit 57, the Step 2 learning circuit 58, and the Step 3 learning circuit. 59 at the time when the select switch time is generated by the selection switching time generation circuit 54, the I/F circuit 56 transmits an FLP signal to the communication partner device.

In this way, when link up is not established even when learning is retried for a certain period, the communication device 2 can learn by determining master and slave with the communication device which is a communication partner, by transmitting an FLP signal to the communication partner device. Thus, it is possible to reliably establish link up.

Further, the reset mask circuit 62 transmits reset signals supplied form the reset signal generation circuit 53 to the Step 1 learning circuit 57, the Step 2 learning circuit 58, and the Step 3 learning circuit 59 at every reset interval, until link up is detected if it is within the selection switching time indicated by the selection switching time generation circuit 54. In this way, the reset mask circuit 62 allows the learning circuits to repeat learning within the selection switching time, in order to reliably establish link up.

Further, when the I/F circuit 56 receives an FLP signal from the communication partner device, the master/slave determination circuit 64 allows the FLP generation circuit 52 to generate an FLP signal to determine master and slave, based on the received FLP signal. The I/F circuit 56 transmits the generated FLP signal to the communication partner device.

In this way, when receiving an FLP signal from the communication partner device, the communication device 2 can learn by determining master and slave with the communication device which is a communication partner, by transmitting an FLP signal corresponding to the received FLP signal to the partner communication device. Thus, it is possible to reliably establish link up.

Further, when receiving a signal indicating that master or slave is determined by the master/slave determination circuit 64, the reset mask circuit 62 performs a mask process on the reset signal supplied from the reset signal generation circuit 53 so that the reset signal is not transmitted to the Step 1 learning circuit 57, the Step 2 learning circuit 58, and the Step 3 learning circuit 59. Further, the Step 1 learning circuit 57, the Step 2 learning circuit 58, and the Step 3 learning circuit 59 establish link up by using an idle signal transmitted from the I/F circuit 56 after master or slave is determined by the master/slave determination circuit 64.

In this way, when determining master or slave in response to the reception of the FLP signal from the communication partner device, the communication device 2 prevents the reset signal from being transmitted to the Step 1 learning circuit 57, the Step 2 learning circuit 58, and the Step 3 learning circuit 59. This can prevent, for example, the learning process from being reset in the course of learning based on the idle signal received from the communication partner device.

While the invention made by the present inventors has been concretely described based on the embodiments, the present invention is not limited to the specific embodiments. It is apparent to those skilled in the art that various modifications and variations can be made without departing from the scope of the present invention. For example, the embodiments have been described in detail for easy understanding of the present invention and are not necessarily limited to those having all the configurations described in the exemplary embodiments. With respect to part of configurations of the respective embodiments described above, it is possible to make addition, deletion, and replacement of other configurations.

For example, the above description has focused on the case in which communication devices to be coupled are respectively set as master and slave. However, MDI and MDI-X are also set in the same manner.

Further, even in specifications with no master/slave concept, such as 100Base-TX and 10Base-T, it is possible to immediately start learning by configuring settings in advance for MDI and MDI-X, without the need to transmit and receive FLP signals to determine that one is MDI and the other is MDI-X. Thus, it is possible to establish link up for a short time in the same manner as described above.

The present invention is applicable to communication devices to be linked up.

What is claimed is:

1. A communication device comprising:
    a master/slave information storage unit that stores master/slave information, wherein the master/slave information indicates that the communication device is either a master device or a slave device;
    a learning signal transmission/reception unit that transmits and receives learning signals for the communication device to link up to and from a communication partner device, wherein the communication partner device is a communication partner of the communication device;
    a link-up unit that establishes link by setting an echo and crosstalk canceller using the learning signals transmitted and received by the learning signal transmission/reception unit to and from the communication partner device;
    a link-up control unit that allows the link-up unit to set again the echo and crosstalk canceller when link up is not established by the link-up unit when a predetermined first time has elapsed; and
    a master/slave determination signal transmission unit that transmits, to the communication partner device, a first master/slave determination signal that identifies one of the communication device and the communication partner device to be the master device,
    wherein the master/slave determination signal transmission unit transmits the first master/slave determination signal when link up is not established by the link-up unit when a second time longer than the first time has elapsed as a result that learning is retried by the link-up control unit, and
    wherein the first master/slave determination signal that identifies one of the communication device and the communication partner device to be the master device is different from the learning signals that is used by the link-up unit to establish the link up between the communication device and communication partner device.

2. The communication device according to claim 1,
    wherein the link-up control unit allows the link-up unit to set again the echo and crosstalk canceller each time the first time has elapsed, until link up is established by the link-up unit or until the second time has elapsed.

3. The communication device according to claim 1, further comprising a master/slave determination signal reception unit that receives a second master/slave determination signal from the communication partner device to determine whether the communication device is one of the master device and the slave device, and whether the communication partner device is another of the master device and the slave device,
    wherein when the second master/slave determination signal is received by the master/slave determination signal reception unit, the master/slave determination signal transmission unit transmits the first master/slave determination signal to the communication partner device, in response to the received second master/slave determination signal.

4. The communication device according to claim 3, further comprising a determination unit that determines the master device and the slave device by the first and second master/slave determination signals transmitted and received by the master/slave determination signal reception unit and the master/slave determination signal transmission unit,
    wherein the link-up unit performs link up according to the determination by the determination unit, and
    wherein when the determination unit determines the master device and the slave device, the link-up control unit stops learning from being retried by the link-up unit associated with the first time elapsed.

5. A link-up method performed by a communication device that stores master/slave information indicating that the communication device is either a master device or a slave device, the link-up method comprising:
    transmitting and receiving, by a learning signal transmission/reception unit, learning signals or link up to and from a communication partner device which is a communication partner of the communication device;

setting, by a link-up unit, an echo and crosstalk canceller using learning signals transmitted to and received from the communication partner device to establish link up;

when link up is not established after a predetermined time has elapsed, allowing, by a link-up control unit, the link-up unit to set again the echo and crosstalk canceller; and when link up is not established by the link-up unit when a second time longer than the first time has elapsed as a result that learning is retried by the link-up control unit, transmitting, from a master/slave determination signal transmission unit to the communication partner device, a master/slave determination signal that identifies one of the communication device and the communication partner device to be the master device, wherein the master/slave determination signal that identifies one of the communication device and the communication partner device to be the master device is different from the learning signals that is used by the link-up unit to establish the link up between the communication device and communication partner device.

6. A communication system including a first communication device, and a second communication device which is a communication partner of the first communication device, wherein the first communication device comprises:

a first information storage unit that stores first information, wherein the first information indicates that the first communication device is a master device;

a first learning signal transmission/reception unit that transmits and receives learning signals for link up to and from the second communication device;

a first link-up unit that establishes link up by setting an echo and crosstalk canceller using learning signals transmitted and received by the first learning signal transmission/reception unit to and from the second communication device; and a first link-up control unit that allows the link-up unit to set again the echo and crosstalk canceller when link up is not established by the first link-up unit when a first time has elapsed; and a master/slave determination signal transmission unit that transmits, to the communication partner device, a first master/slave determination signal that identifies one of the first communication device and the second communication device to be the master device, wherein the master/slave determination signal transmission unit transmits the first master/slave determination signal when link up is not established by the link-up unit after a second time longer than the first time has elapsed as a result that learning is retried by the link-up control unit, wherein the first master/slave determination signal that identifies one of the first communication device and the second communication device to be the master device is different from the learning signals that is used by the link-up unit to establish the link up between the first communication device and the second communication device, wherein the second communication device comprises:

a second information storage unit that stores second information, wherein the second information indicates that the second device is a slave device;

a second learning signal transmission/reception unit that transmits and receives learning signals for link up to and from the first communication device;

a second link-up unit that establishes link up by setting an echo and crosstalk canceller using learning signals transmitted and received by the second learning signal transmission/reception unit to and from the first communication device; and a second link-up control unit that allows the link-up unit to set again the echo and crosstalk canceller when link up is not established by the second link-up unit when the first time has elapsed.

* * * * *